United States Patent
Narvaez (10) Patent No.: US 10,366,135 B2
(45) Date of Patent: *Jul. 30, 2019

(54) ZERO FOOTPRINT APPLICATION VIRTUALIZATION

(71) Applicant: CERNER INNOVATION, INC., Kansas City, KS (US)

(72) Inventor: Juan David Narvaez, Kansas City, KS (US)

(73) Assignee: CERNER INNOVATION, INC., Kansas City, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/389,018

(22) Filed: Dec. 22, 2016

(65) Prior Publication Data

US 2017/0103139 A1    Apr. 13, 2017

Related U.S. Application Data

(63) Continuation of application No. 13/664,069, filed on Oct. 30, 2012, now Pat. No. 9,563,716.

(51) Int. Cl.

| G06F 15/16 | (2006.01) |
| G06F 16/957 | (2019.01) |
| H04L 12/24 | (2006.01) |
| H04L 12/26 | (2006.01) |
| H04L 29/06 | (2006.01) |
| H04L 29/08 | (2006.01) |
| H04N 21/24 | (2011.01) |
| H04N 21/442 | (2011.01) |

(Continued)

(52) U.S. Cl.
CPC ............ *G06F 16/957* (2019.01); *H04L 41/20* (2013.01); *H04L 43/045* (2013.01); *H04L 43/08* (2013.01); *H04L 65/1069* (2013.01); *H04L 65/60* (2013.01); *H04L 67/02* (2013.01); *H04L 67/34* (2013.01); *H04L 65/4069* (2013.01); *H04N 21/2402* (2013.01); *H04N 21/44222* (2013.01); *H04N 21/4782* (2013.01); *H04N 21/8153* (2013.01)

(58) Field of Classification Search
CPC ......... H04L 29/06; H04L 67/02; H04L 67/12; H04L 67/22; H04L 67/28; H04L 67/32; H04L 67/34; H04L 67/322; H04L 67/2823; H04L 69/329; H04L 41/0213; H04L 41/0253; H04L 41/0266
USPC .................... 709/202, 203, 219, 224, 231
See application file for complete search history.

(56) References Cited

U.S. PATENT DOCUMENTS

| 2006/0106932 A9* | 5/2006 | Behrens | H04L 29/06 709/227 |
| 2008/0313545 A1* | 12/2008 | Patel | H04L 29/08846 715/738 |
| 2010/0268842 A1 | 10/2010 | Kim et al. | |

(Continued)

*Primary Examiner* — Farzana B Huq
(74) *Attorney, Agent, or Firm* — Shook, Hardy & Bacon L.L.P.

(57) ABSTRACT

Systems, methods, and computer-readable media for delivering an interactively updated application to a browser without requiring end users to install software locally are provided. Browser capabilities are detected. Bi-directional communication is established between a browser and server based on the capabilities. Representations of images are streamed to the browser. Human input device events associated with the representations are received. The representations are interactively updated.

13 Claims, 3 Drawing Sheets

(51) Int. Cl.
*H04N 21/4782* (2011.01)
*H04N 21/81* (2011.01)

(56) References Cited

U.S. PATENT DOCUMENTS

| 2012/0151372 A1* | 6/2012 | Kominac | G06F 17/30905 |
| | | | 715/740 |
| 2012/0242841 A1* | 9/2012 | Escol | H04L 65/602 |
| | | | 348/207.1 |
| 2014/0002504 A1* | 1/2014 | Farmer | G09G 5/00 |
| | | | 345/660 |

* cited by examiner

ZERO FOOTPRINT APPLICATION VIRTUALIZATION

CROSS REFERENCE TO RELATED APPLICATIONS

This application is a continuation of copending U.S. application Ser. No. 13/664,069, entitled "Zero Footprint Application Virtualization," filed Oct. 30, 2012, which is hereby expressly incorporated by reference in its entirety.

BACKGROUND

Several methods for virtualizing desktop sessions or applications through Transmission Control Protocol (TCP) channels have been developed. These methods allow users to connect to a remote server via a user device and run a desktop session or application on that server as if it were running locally on the device. For example, Citrix, VMware, and others build such virtualization platforms the Remote Desktop Protocol (RDP). Unfortunately, these methods require users desiring to run the virtual desktop sessions or applications to install and manage additional software or codecs. Not only does this present potential security issues for various users, particularly corporate users, but it also dramatically increases the total cost of ownership because licensing fees must be paid to the technology suppliers.

In a health care setting, clinicians often do not have the access to information technology (IT) personnel to assist with installing and managing a virtualization platform on the clinician's device. Furthermore, such use of a personal device may violate security policy for a particular health care facility, especially for nonemployees (e.g. a physician with privileges at a hospital). Consequently, unless the clinician is able to convince the health care facility to install and manage the required applications and open the necessary holes in the firewall to allow access for the clinician's device, the clinician is unable to access a particular application for that facility.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Utilizing the methods and systems described herein, computerized systems, methods, computer storage media having computer-executable instructions embodied thereon for performing the disclosed methods, and user interfaces for delivering an application through a browser without requiring end users to install software locally, are provided. In one aspect, the present invention provides one or more computer storage media storing computer-useable instructions that, when executed by one or more computing devices, cause the one or more computing devices to perform a method for interactively updating a representation of an image. The method comprises detecting browser capabilities of a browser. Bi-directional communication is established between the browser and a server based on the capabilities. A representation of an image is streamed to the browser. A human input device (HID) event associated with the representation is received. The representation is interactively updated.

In another aspect, the present invention provides one or more computer storage media storing computer-useable instructions that, when executed by one or more computing devices, cause the one or more computing devices to perform a method for delivering an application to a browser. Communication is established between a browser and a server. Encoded tiles representing an application are streamed from the server to the browser. The tiles are rendered without requiring installation of any additional software or codecs.

In yet another aspect, the present invention provides a computer system, comprising a processor coupled to a computer storage medium, the computer storage medium having stored thereon a plurality of computer software components executable by the processor, for delivering an interactively updated application to a browser without requiring end users to install software locally. Capability component detects browser capabilities for a browser. Communication component establishes bi-directional communication between the browser and a server based on the capabilities. Stream component streams a representation of an image to the browser. Tile component divides the representation into tiles. Event component receives a HID event associated with a tile. Update component interactively updates the tile.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computerized methods and systems for delivering an application through a browser without requiring end users to install software locally. Utilizing the methods and systems described herein, a clinician is able to login to a health care system and view an interactive and dynamically updated representation of the application in a web standard image format. The conversion of the application into an image allows the application to be delivered to a browser without the requiring the clinician to install the application itself or any support software or plug-ins. In embodiments, the image is divided into tiles allowing the web service to interpret interactions with the image which, in turn, allows the image to be dynamically updated.

Having briefly described embodiments of the present invention, an exemplary operating environment suitable for use in implementing embodiments of the present invention is described below.

Figure 1:
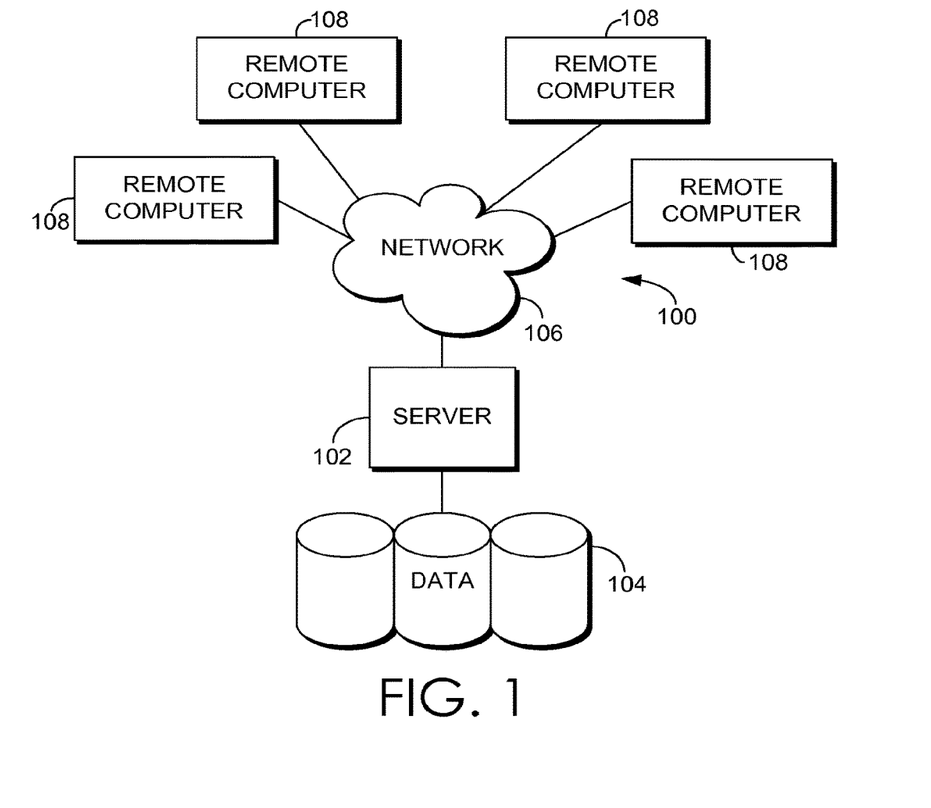
FIG. 1 is a block diagram of an exemplary computing environment suitable for use in implementing embodiments of the present invention.

Referring to the drawings in general, and initially to FIG. 1 in particular, an exemplary computing system environment, a medical information computing system environment, with which embodiments of the present invention may be implemented is illustrated and designated generally as reference numeral 20. It will be understood and appreciated by those of ordinary skill in the art that the illustrated medical information computing system environment 100 is merely an example of one suitable computing environment and is not intended to suggest any limitation as to the scope of use or functionality of the invention. Neither should the medical information computing system environment 100 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in association with local and/or remote computer storage media including, by way of example only, memory storage devices.

With continued reference to FIG. 1, the exemplary medical information computing system environment 100 includes a general purpose computing device in the form of a control server 102. Components of the control server 102 may include, without limitation, a processing unit, internal system memory, and a suitable system bus for coupling various system components, including database cluster 104, with the control server 102. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of computer-readable media, for instance, database cluster 104. Computer-readable media can be any available media that may be accessed by server 102, and includes volatile and nonvolatile media, as well as removable and non-removable media. By way of example, and not limitation, computer-readable media may include computer storage media. Computer storage media may include, without limitation, volatile and nonvolatile media, as well as removable and non-removable media implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. By way of example, and not limitation, communication media includes wired media such as a wired network or direct-wired connection, and wireless media such as acoustic, RF, infrared, and other wireless media. Combinations of any of the above also may be included within the scope of computer-readable media.

The computer storage media discussed above and illustrated in FIG. 1, including database cluster 104, provide storage of computer-readable instructions, data structures, program modules, and other data for the control server 102.

The control server 102 may operate in a computer network 106 using logical connections to one or more remote computers 108. Remote computers 108 may be located at a variety of locations in a medical or research environment, for example, but not limited to, clinical laboratories (e.g., molecular diagnostic laboratories), hospitals and other inpatient settings, veterinary environments, ambulatory settings, medical billing and financial offices, hospital administration settings, home health care environments, and clinicians' offices. Clinicians may include, but are not limited to, a treating physician or physicians, specialists such as intensivists, surgeons, radiologists, cardiologists, and oncologists, emergency medical technicians, physicians' assistants, nurse practitioners, nurses, nurses' aides, pharmacists, dieticians, microbiologists, laboratory experts, laboratory technologists, genetic counselors, researchers, veterinarians, students, and the like. The remote computers 108 may also be physically located in non-traditional medical care environments so that the entire health care community may be capable of integration on the network. The remote computers 108 may be personal computers, servers, routers, network PCs, peer devices, other common network nodes, or the like, and may include some or all of the elements described above in relation to the control server 102. The devices can be personal digital assistants or other like devices.

Exemplary computer networks 106 may include, without limitation, local area networks (LANs) and/or wide area networks (WANs). Such networking environments are commonplace in offices, enterprise-wide computer networks, intranets, and the Internet. When utilized in a WAN networking environment, the control server 102 may include a modem or other means for establishing communications over the WAN, such as the Internet. In a networked environment, program modules or portions thereof may be stored in association with the control server 102, the database cluster 104, or any of the remote computers 108. For example, and not by way of limitation, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) may be utilized.

In operation, a clinician may enter commands and information into the control server 102 or convey the commands and information to the control server 102 via one or more of the remote computers 108 through input devices, such as a keyboard, a pointing device (commonly referred to as a mouse), a trackball, or a touch pad. Other input devices may include, without limitation, microphones, satellite dishes, scanners, or the like. Commands and information may also be sent directly from a remote healthcare device to the control server 102. In addition to a monitor, the control server 102 and/or remote computers 108 may include other peripheral output devices, such as speakers and a printer.

Although many other internal components of the control server 102 and the remote computers 108 are not shown, those of ordinary skill in the art will appreciate that such components and their interconnection are well known. Accordingly, additional details concerning the internal construction of the control server 102 and the remote computers 108 are not further disclosed herein.

Although methods and systems of embodiments of the present invention are described as being implemented in a WINDOWS operating system, operating in conjunction with an Internet-based system, one of ordinary skill in the art will recognize that the described methods and systems can be implemented in any system supporting the generation and management of personalized plans of health, and/or components associated therewith. As contemplated by the language above, the methods and systems of embodiments of the present invention may also be implemented on a stand-alone desktop, personal computer, or any other computing device used in a healthcare environment or any of a number of other locations.

As previously mentioned, embodiments of the present invention relate to methods, systems, and computer-readable media for use in, e.g., a healthcare environment, delivering an application through a browser without requiring end users to install software locally. For simplicity, the particular user will often be referred to herein as a user, a care provider, or a clinician. However, it will be understood that the particular user may be any healthcare professional, physician, or other provider, as described above.

Figure 2:
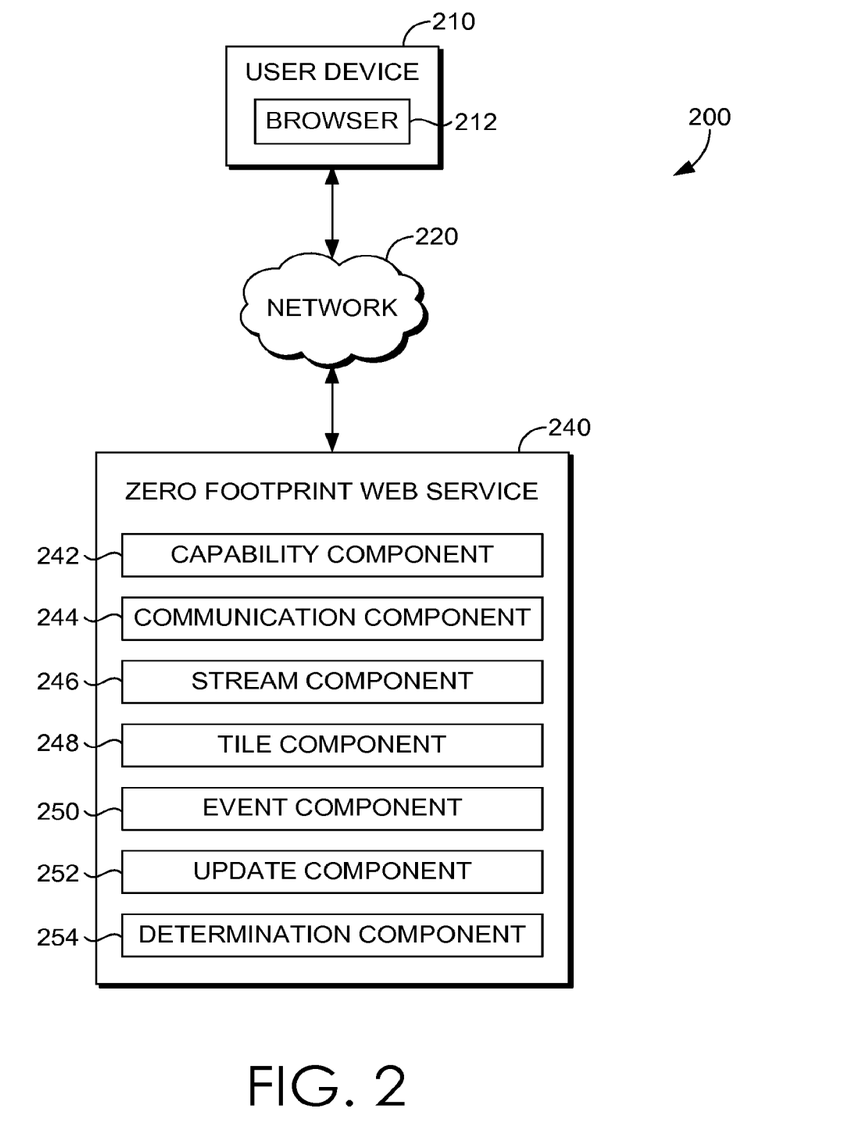
FIG. 2 is an exemplary system architecture suitable for use in implementing embodiments of the present invention.

With reference to FIG. 2, an exemplary system suitable for use in implementing embodiments of the present invention is shown and designated generally as reference numeral 200. It will be appreciated that the computing system architecture shown in FIG. 2 is merely an example of one suitable computing system and is not intended as having any dependency or requirement related to any single module/component or combination of modules/components.

The system 200 includes a user device in communication via network 210 with zero footprint web service 240. Zero footprint web service 240 may be in communication with a health care information system, one or more databases (i.e., such as a database containing health care images and the like). It should be appreciated that user device 210 can be any device capable of running any type of web browser 212 or any application capable of rendering web pages. It should also be appreciated that although only a single user device 210 is depicted, many user devices may be in communication via network 220 to zero footprint web service 240.

Zero footprint web service 240 may be integrated or associated with a healthcare information system. Zero footprint web service 240 may be integrated or associated with a particular application. Zero footprint web service 240 may be integrated or associated with particular items associated with a health care information system or application (e.g., images or videos). Zero footprint web service 240 may reside on one or more computing devices, such as, for example, the server 102 described above with reference to FIG. 1. By way of example, the server 102 includes a computer processor and may be a server, personal computer, desktop computer, laptop computer, handheld device, mobile device, consumer electronic device, or the like.

In various embodiments, zero footprint web service 240 is comprised of various components, including capability component 242, communication component 244, stream component 246, tile component 248, event component 250, update component 252, and determination component 254.

Capability component 242 detects browser capabilities of a browser. In one embodiment, compatibility component 242 attempts to establish a Websocket connection. If the Websocket instantiation fails, in one embodiment, compatibility component 242 attempts to establish a Flashsocket connection if the browser has an available Flash plug-in. If the Flashsocket instantiation fails, in one embodiment, compatibility component 242 establishes a Comet connection. The Websockets and Flash implementations reduce overhead of HTTP communication and allow for a better real-time web application experience. However, Websockets is not supported by all browsers and Flash is not available on all devices. Further, even when Websockets are supported by a browser, the server must also support the Websocket Protocol. In these instances, the Comet implementation is utilized as a fallback.

Once the browser capability is detected by compatibility component 242, communication component 244 establishes communication between the browser and a server based on the capabilities. In one embodiment, a remote desktop session (RDS) broker is created that resides on the server. The RDS broker acts as the RDS client to an RDS session for a particular application and marshals the output of the RDS session to the browser. In one embodiment, HTML5 is not utilized or required by the browser. In one embodiment, the representation of the image is not drawn on an HTML5 canvas. Rather, representations of the desktop are marshaled to the browser as it is redrawn.

In one embodiment, the RDS broker marshals the output of an application running on the RDS session to the browser. In one embodiment, the RDS broker marshals the output of multiple applications running on the RDS session to the browser. In one embodiment, the RDS broker marshals the output of the entire RDS session to the browser. In embodiments, the RDS session comprises a session manager, a stream component 246, and an event component 250. The session manager creates and manages RDS sessions. The session manager also maintains a graphic representation of what would be shown in a browser on a display device for the particular application.

Stream component 246 streams a representation of an image or video, or the graphic representation of the particular application, to the browser. The representation renders what is represented by the session manager at the point in time a request was made to render the application. In other words, the image or particular application itself is not transferred. Rather, a representation of the image or particular application is rendered within the browser.

Tile component 248 divides the representation into tiles. The tiles represent sections or portions of the representation and can be configured in any size or shape depending on the image or application. In one embodiment, tile component 248 divides the representation into a grid comprising tiles and a display bar. The display bar may be associated with user selectable icons that can be used to manipulate the representation or particular application.

Event component 250 receives a human input device (HID) event associated with a tile. The HID event can be associated with a touch, a gesture, a keypad or keyboard, a mouse, voice recognition, or any other type of event capable of conveying an input to a device. Update component 252 interactively updates the tile. This allows zero footprint web service 240 to only redraw the parts of the screen (i.e., tiles of the representation of the image) that need to be redrawn. In this sense, zero footprint web service 240 focuses on what the user is interacting with and updates that portion first.

In one embodiment, update component 252 increases the quality of the tile the user is interacting with before increasing the quality of other tiles. In another embodiment, update component 252 updates the tile the user is interacting with before updating the other tiles. In one embodiment, update component 252 updates the tiles associated with the grid but does not update the tiles associated with the display bar. This allows the resources associated with the zero footprint web service 240 to be more efficiently utilized by only updating the portion of the representation (i.e., the image) to the desired resolution or quality in accordance with the browser capabilities, bandwidth, device type, and the like.

In one embodiment, update component 252 updates the tiles to a predetermined quality when an idle state is detected. This allows the representation to be displayed in a maximum or predetermined quality in accordance with the browser capabilities, bandwidth, device type, and the like, while not interfering with updates when the user is interacting with a particular tile. For example, a clinician may be analyzing and interacting with a particular tile associated with the representation. Rather than wasting the resources associated with the zero footprint web service 240, update component 252 does not update all the tiles of the representation and instead focuses on the tiles associated with the interaction.

In one embodiment, determination component 254 determines the tile that is associated with the HID event. This allows the zero footprint web service 240, and more particularly, the update component 252 to update the representation according to the tile the user is interacting with and maintain the efficiency of resources as discussed above.

Figure 3:
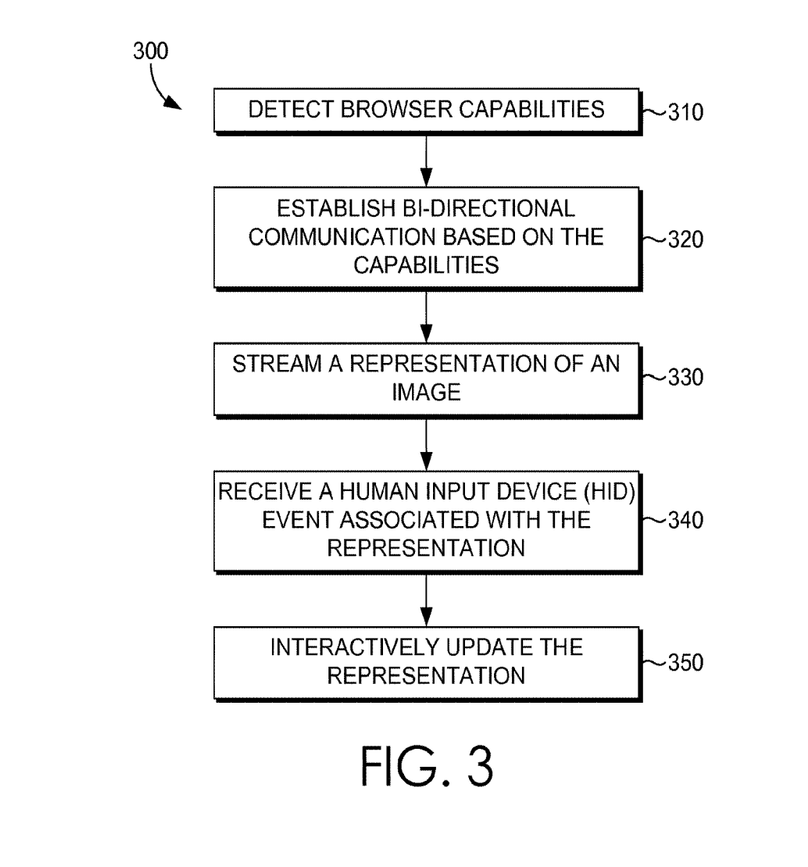
FIG. 3 is a flow diagram illustrating a method for interactively updating a representation of an image in accordance with an embodiment of the present invention.

Referring now to FIG. 3, a flow diagram illustrating a method 300 for interactively updating a representation of an image in accordance with an embodiment of the present invention is shown. At step 310, browser capabilities of a browser are detected. In various embodiments, the browser capabilities include Websockets, Flashsockets, Comet, and iFrame.

In one embodiment, bandwidth is detected. In one embodiment, a device type is detected. Each of the browser capabilities, bandwidth, device type, and the like can influence how the representation is updated. For example, in one embodiment, a lossless Portable Network Graphics (PNG) image is requested when highest quality has been reached if the bandwidth is high enough and the device type supports it. In another embodiment, the representation of the image is a Joint Photographic Experts Group (JPEG) image.

Bi-directional communication is established at step 320, between the browser and a server based on the capabilities. In one embodiment, communication is first attempted via Websockets. In another embodiment, communication is attempted via Flashsockets. In yet another embodiment, communication is attempted via Comet. In one embodiment, Websockets communication is attempted first and, if that fails, Flashsockets communication is attempted and, if that fails, Comet communication is attempted.

At step 330, a representation of an image is streamed to the browser. The image may be an image associated with an image or video or an image associated with a particular application. However, rather than streaming the actual image, only a representation of the image is streamed to the browser. This allows the browser to display the representation without requiring the installation of any software or codecs.

A human input device (HID) event associated with the representation is received at step 340. In one embodiment, the HID event includes a mouse movement. In another embodiment, the HID event includes a keystroke. In another embodiment, the HID event includes a gesture. In another embodiment, the HID event includes a voice command.

The representation, at step 350, is interactively updated. This allows the representation to be updated in response to the HID event. This simulates interaction with the actual image or application. In one embodiment, the representation of the image is divided into tiles. In one embodiment, the representation of the image is divided into a grid comprising tiles and a display bar. The display bar may include icons, a control bar or panel, or a menu, and the like and allows a user to manipulate the representation as if the user were actually running the application on the user's device. However, in embodiments, the display bar does not need to be updated as often as the grid.

In one embodiment, a tile of the representation is determined to be associated with the HID event. In one embodiment, the tile is updated in accordance with the HID event. For example, a user may want to zoom in or out on a particular tile or move or otherwise manipulate the tile (i.e., select a button, execute some functionality within an application, and the like). As discussed above, this allows the user to simulate interaction with the application on his or her device without actually having the application running on his or her device.

In one embodiment, the tile is updated to a predetermined quality. This allows the tile the user is interacting with to be updated first. In one embodiment, the user is detected as being idle. In other words, no HID events are currently being received. In one embodiment, any tiles that have not already been updated or are not lossless are updated. This allows the most efficient use of resources as tiles that are not being interacted with are only updated when the user is idle. In this regard, a tile are only updated when a HID event is received that is associated with that tile or when the user is idle.

Figure 4:
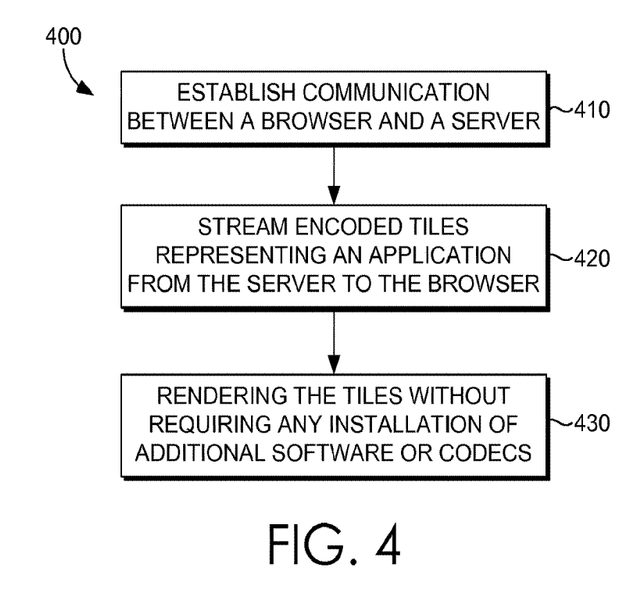
FIG. 4 is a flow diagram illustrating a method for delivering an application to a browser in accordance with an embodiment of the present invention.

Referring now to FIG. 4, a flow diagram illustrating a method 400 for delivering an application to a browser in accordance with an embodiment of the present invention is shown. At step 410, communication is established between a browser and a server. The server may be associated with an application, an image, a video, and the like. In one embodiment, browser capabilities are detected for the browser. In one embodiment, detecting browser capabilities comprises attempting to establish a Websocket connection. In one embodiment, a Flashsocket connection is attempted if Websocket instantiation fails and the browser has an available Flash plug-in. In one embodiment, a Comet connection is established if Flashsocket instantiation fails.

Encoded tiles representing an application are streamed, at step 420, from the server to the browser. The tiles are rendered without requiring installation of any additional software or codecs at step 430. The encoded tiles allow a user, via the browser, to view a representation of the application, video, or image, as if the application, video, or image were running locally on the user's device. In one embodiment, the encoded tiles are interactively updated based on detecting user interaction. This allows the user to interact with the representation of the application, video, or image as if the user were interacting with the application, video, or image itself.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and within the scope of the claims.

The invention claimed is:

1. One or more non-transitory computer storage media (the "media") storing computer-useable instructions that, when executed by one or more computing devices, cause the one or more computing devices to perform a method for establishing bi-directional communication for an application virtualization platform, the method comprising:
    determining, based on capabilities of a browser, one or more supported communication protocols of the browser;
    determining that a first communication protocol from the one or more supported communication protocols of the browser is a supported communication protocol of a server;
    establishing a communication link between the browser and the server according to the first communication protocol;
    streaming a representation of an application to the browser, the representation of the application comprising a plurality of encoded tiles encoded according to the supported communication protocol, wherein the representation is streamed in a format corresponding to the first communication protocol that allows the representation to be rendered without requiring installation of software or codecs by the browser;
    receiving a human input device (HID) event associated with the representation via the browser; and
    interactively updating the representation in response to receiving the HID event.

2. The media of claim 1, wherein the browser supports two or more communication protocols and the supported communication protocol is a communication protocol having a lowest protocol overhead of the two or more communication protocols.

3. The media of claim 1, further comprising detecting a device type of a device hosting the browser.

4. The media of claim 3, wherein the supported communication protocol is a communication protocol supported by the device type and the browser.

5. The media of claim 1, wherein the HID event includes a mouse movement, keystroke, or gesture.

6. The media of claim 1, further comprising detecting a bandwidth associated with the established communication link.

7. The media of claim 1, wherein the first communication protocol comprises Websockets, Flashsockets, Comet, or iframe.

8. A method for delivering an application to a browser, the method comprising:
    determining an available communication protocol, wherein the available communication protocol is supported by a browser and a server without requiring installation of software or codecs;
    establishing communication between the server and the browser according to the available communication protocol;
    initiating, by the server, a remote session of an application;
    streaming a graphic representation of the application from the server to the browser according to the available communication protocol, wherein the graphic representation of the application comprises a plurality of encoded tiles encoded according to the available communication protocol;
    receiving, via the browser, a human input device (HID) event associated with a tile of the plurality of encoded tiles; and
    interactively updating the tile in response to receiving the HID event.

9. The method of claim 8, wherein the graphic representation comprises one or more images.

10. A computer system for delivering an interactively updated application to a browser without requiring end users to install software locally, the computer system comprising:
    one or more processors; and
    one or more computer storage media storing computer-useable instructions that, when executed by the one or more processors, implement a method comprising:
    detecting, based on capabilities of a browser, a supported communication protocol, wherein the supported communication protocol is supported by the browser and a server without requiring installation of software or codecs;
    establishing bi-directional communication between the browser and the server based on the supported communication protocol;
    streaming a graphic representation of an application from the server to the browser in a format corresponding to the supported communication protocol, wherein the graphic representation of the application comprises a plurality of encoded tiles encoded according to the supported communication protocol;
    receiving a human input device (HID) event associated with the representation via the browser; and
    interactively updating the representation in response to receiving the HID event.

11. The system of claim 10, wherein the method implemented by the one or more processors further comprises establishing, by the server, a remote desktop session of the application.

12. The system of claim 11, wherein the method implemented by the one or more processors further comprises streaming, by the server to the browser, the remote desktop session.

13. The system of claim 10, wherein the graphic representation comprises an image representing the application.

* * * * *